United States Patent [19]

Tzvieli

[11] Patent Number: 5,659,593
[45] Date of Patent: Aug. 19, 1997

[54] DETECTION OF DEVIATIONS IN MONITORED PATTERNS

[75] Inventor: Dvora Tzvieli, Marlboro, N.J.

[73] Assignee: Lucent Technologies Inc., Murray Hill, N.J.

[21] Appl. No.: 346,808

[22] Filed: Nov. 30, 1994

[51] Int. Cl.[6] .................... H04M 1/24; H04M 3/08; H04M 3/22
[52] U.S. Cl. .................. 379/13; 379/10; 379/15; 379/112; 379/114; 379/115; 370/244
[58] Field of Search .................. 379/1, 10, 11, 379/12, 13, 15, 34, 111, 112, 113, 114, 115, 121; 370/13, 17, 244

[56] References Cited

U.S. PATENT DOCUMENTS

| | | | |
|---|---|---|---|
| 5,164,983 | 11/1992 | Brown et al. | 379/112 |
| 5,289,368 | 2/1994 | Jordan et al. | 379/113 |
| 5,359,649 | 10/1994 | Rosu et al. | 379/113 |
| 5,461,699 | 10/1995 | Arbabi et al. | 364/401 |
| 5,488,648 | 1/1996 | Womble | 379/13 |

*Primary Examiner*—Curtis Kuntz
*Assistant Examiner*—Paul Loomis

[57] ABSTRACT

A system and method for detecting significant deviations in a pattern in near real time by making forecasts about the pattern and determining if the actual pattern is within a threshold of the forecast. The preferred embodiment is a method for detecting recording errors in a telephone network that provides services to a plurality of customers, the method comprising: recording information output by the telephone network relating to a service that was provided to the customers in a first time period; forecasting, based on the recorded information, information that will be output by the network in a second time period that has not yet occurred; recording information output by the telephone network relating to the provision of the service to the customers in the second time period; and comparing the result of the forecasting step with the information recorded during the second time period to generate a deviation.

35 Claims, 7 Drawing Sheets

DETECTION OF DEVIATIONS IN MONITORED PATTERNS

FIELD OF THE INVENTION

This invention relates to the monitoring of a pattern to detect significant deviations from a previously made forecast of the pattern. In the preferred embodiment, the invention relates to the monitoring of call detail recording in a telephone network and, more specifically, to a system for detecting recording failures in near real time.

BACKGROUND OF THE INVENTION

Telephone systems must record details of telephone activity in order to appropriately bill customers for the services provided. Errors in call detail recording (or "CDR") can result in significant revenue loss to the telephone service provider. Such errors can be caused by call provisioning errors, errors in the transmission of billing information between telephone systems, errors in billing number screening databases, and hardware and software errors.

CDR errors are usually discovered in down-stream billing systems long after they have occurred. Earlier detection can lead to correction of the problem and minimization of the revenue loss.

SUMMARY OF THE INVENTION

The disadvantages of the prior art have been overcome by the present invention which provides, in its preferred embodiment, a system and method for detecting recording errors in a telephone network in near real time by making forecasts about recording information and determining if the actual recording information is within a threshold of the forecast.

In one embodiment, the invention features a method for detecting recording errors in a telephone network that provides services to a plurality of customers, the method comprising: recording information output by the telephone network relating to the provision of a service to the customers in a first time period; forecasting, based on the recorded information, the expected content of information that will be output by the network for a second time period that has not yet occurred; recording information output by the telephone network relating to the provision of the service to the customers in the second time period; and comparing the result of the forecasting step with the information recorded during the second time period to generate a deviation.

In preferred embodiments, the method further comprises the steps of: forecasting, based on the information recorded during the second time period, the expected, content of information that will be output by the network for a third time period that has not yet occurred; recording information output by the network relating to the provision of the service to the customers in the third time period; and comparing the result of the step of forecasting associated with the third time period with the information recorded during the third time period to generate a deviation.

The preferred method generates an alarm if the deviation is greater than a predetermined threshold, and the steps are carried out for a plurality of services provided by the network. An alarm is automatically generated each time a generated deviation for any of the services is greater than a threshold.

The first time period can correspond to a preceding time period and the second time period can correspond to a future time period, with all of the steps being iteratively repeated to continuously generate deviations corresponding to a comparison of data recently output by the network and a forecast for the recently output data.

The step of generating an alarm can be suspended for data output by the network during a holiday period due to the irregularities usually experienced during holidays.

The step of forecasting can include the steps of generating a model to fit the information recorded in the first time period and using the model to generate a forecast of data that will be recorded in the second time period. A quality measurement can periodically be made of the model to determine whether a new forecasting model should be generated.

The method of the invention can be applied to each of a number of services being provided by the telephone network. The method can further comprise the step of generating a timeseries for each service provided by the network, each timeseries comprising data relating to the provision of a service to the customers as a function of time.

The step of forecasting can further comprise the steps of generating a model to fit each of the timeseries and using each model to generate a forecast for each timeseries to predict values for each timeseries during a future time period. The step of generating a model preferably comprises identifying a number of potential model forms for the timeseries, ordering the potential model forms according to the likelihood that each will fit the timeseries, and iteratively fitting each of the potential model forms to find a model form that satisfactorily fits the timeseries.

The step of using each model to generate a forecast for each timeseries includes the steps of identifying, in each timeseries, data that differs from forecast data by greater than a threshold and replacing the identified data in each timeseries.

A default model can be generated for each timeseries, the default model being chosen as the model for the timeseries if none of the potential model forms fit the timeseries. The potential model forms for each timeseries are selected from a stored library of model forms associated with each timeseries.

Two timeseries are generated for each service provided by the network, including: (1) a volume timeseries identifying the number of times each service is provided by the network as a function of time; and (2) a ratio timeseries identifying the ratio of the number of times the network connects a call corresponding to each service over a given time period to the number of times the network disconnects a call corresponding to each service over the given period of time, as a function of time.

In another aspect, the invention features a method for detecting recording errors in a telephone network that provides services to a plurality of customers, the method comprising: (a) recording information output by the telephone network relating to the provision of a service to the customers in a first time period; (b) generating a model to fit the information recorded in the first time period; (c) using the model to generate a forecast of information to be output by the telephone network in a future time period; (d) recording, during the occurrence of the future time period, information output by the telephone network relating to the provision of the service to the customers; (e) comparing the forecast generated in step c with the information recorded in step d to generate a deviation; and (f) repeating steps c–e to continuously generate deviations between information output by the network and forecast information.

In preferred embodiments, the method of the invention further comprises the steps of: (g) periodically making a quality measurement of the model; (h) determining, based on the quality measurement, whether a new forecasting model should be generated; and (i) if the result of step h indicates that a new forecasting model should be generated, then performing the additional steps of (j) generating a new forecasting model to fit information recorded in a predetermined prior time period; and (k) substituting the new forecasting model for the model being used for forecasting in the repeated implementation of steps c–e. Step k is preferably carried out while maintaining the continuous generation of deviations as specified in step f.

In yet another aspect, the invention features a method for detecting deviations between a monitored pattern and a forecast for the pattern, the method comprising: (a) recording the pattern during a first time period; (b) generating a model to fit the pattern recorded in the first time period; (c) using the model to generate a forecast of the pattern in a future time period; (d) recording the pattern during the occurrence of the future time period; (e) comparing the forecast generated in step c with the pattern recorded in step d to generate a deviation; (f) repeating steps c–e to continuously generate deviations between the pattern and a forecast of the pattern; (g) periodically making a quality measurement of the model; (h) determining, based on the quality measurement, whether a new forecasting model should be generated; and, if so, performing the additional steps of: (i) generating a new forecasting model to fit information recorded in a predetermined prior time period; and (j) substituting the new forecasting model for the model being used for forecasting in the repeated implementation of steps c–e. Once again, step j is preferably carried out while continuously generating deviations as specified in step f.

In still another aspect, the invention features a method for detecting deviations between a plurality of monitored patterns and a forecast for each pattern, the method comprising: (a) generating a timeseries for each monitored pattern, each timeseries comprising data relating to the value of the pattern as a function of time; (b) selecting a model to fit each timeseries, the selection for each timeseries comprising the steps of: (1) identifying a number of potential model forms for the timeseries; and (2) iteratively fitting each of the potential model forms to find a model that satisfactorily fits the timeseries; (c) using the model to generate a forecast of each timeseries in a future time period; (d) recording each timeseries during the occurrence of the future time period; (e) comparing each forecast generated in step c with the timeseries recorded in step d to generate a deviation; and (f) repeating steps c–e to continuously generate deviations between the pattern and a forecast of the pattern.

The invention provides a significant improvement in the monitoring of call detail records in a telephone network since the monitoring can be done in near real time, can be applied simultaneously to a large amount of data output by the network in a fully automated way, and can self-adapt to changes in the data. The near real time detection of recording errors using the invention can cause early detection of telephone recording errors and a resulting significant savings of revenue.

Furthermore, the pattern monitoring techniques of the invention find application in fields other than telephone networks, such as, e.g., executive decision support systems, fraud detection in various fields, and the analysis of demographic pattern changes. Other advantages and applications of the invention will be apparent to those skilled in the art from the following detailed description of a preferred embodiment of the invention, as applied to a telephone network.

DETAILED DESCRIPTION OF THE PREFERRED EMBODIMENT

The preferred embodiment of the invention is a system for CDR Monitoring (or "CDRM") in near real time to detect errors significantly sooner than in traditional down stream analysis. One embodiment of the present invention will be described in the environment of monitoring of call detail recording associated with AT&T 4ESS™ and 5ESS™ switches. The electronic switching system of the 4ESS™ design is described in greater detail in a series of articles published in the Bell System Technical Journal (BSTJ), September 1977, Vol. 56, No. 7 at pages 1017 et seq., incorporated herein by reference. The electronic switching system of the 5ESS™ design is extensively described in a series of articles in the AT&T Technical Journal, Vol. 64, No. 6, part 2, July/August 1985, at pages 1305–1564, also incorporated herein by reference.

Figure 1:
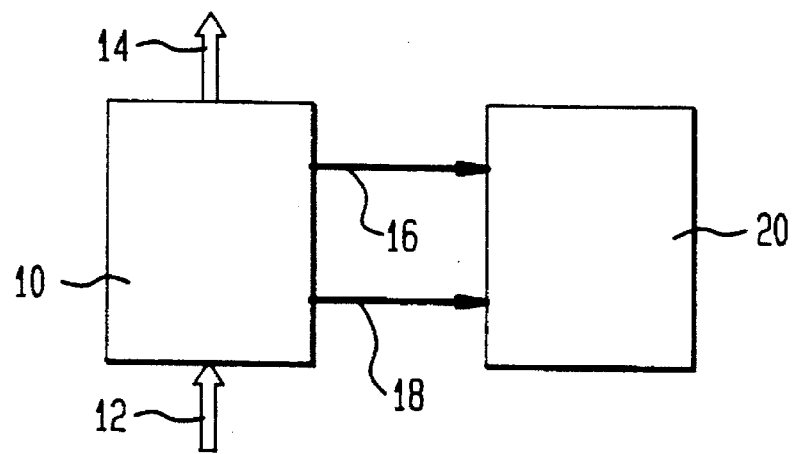
FIG. 1 is a block diagram of a system according to one embodiment of the invention.

FIG. 1 shows a telephone switch 10 (such as a 4ESS™ or 5ESS™) having a number of inputs 12 and a number of outputs 14. Inputs 12 and outputs 14 are, for example, calls being routed by switch 10, as will be well known in the art. Switch 10 provides a number of services to the customers of the telephone network to which switch 10 belongs, and information concerning the provided services is output at outputs 16, 18. Outputs 16, 18 are received by CDRM system 20, which functions to monitor these outputs and detect errors in the information as is described further below. CDRM system 20 can include a general purpose digital processor and suitable memory, as will be apparent to those of skill in this art.

There are a number of different types of services offered on the AT&T 4ESS™ switch which can be monitored by the present invention. An automated message accounting record (or "AMA") is formed for each monitored call. AMA records are similar to CDRs. Examples of the information on the 4ESS™ used by the present invention include the following:

(1) "PBEAV"—Direct Voice Interface and Equal Access Signaling Voice. These are 1+ calls made from subscriber stations that are billed for the call. They include regular long distance calls from home.

(2) "DSDC"—Direct Service Dialing Capability. These are the 1(800)+ calls where the called station is billed for the call. (Sometimes called the "INWATS" calls.)

(3) "BSDN"—Basic software Defined Network calls. These are calls that are switched over "virtual" private networks. Billing to the calling subscriber includes a monthly charge plus a charge for aggregates of calls to various area codes specified in the customer's service order. Individual calls switch only to the specified area codes.

(4) MEG—MEGACOM service is similar to "OUT-WATS" service. Subscriber PBX's have direct links to the 4ESS™, bypassing the local exchange (i.e., local telephone carrier). The AT&T switch knows who to bill by knowing the nature of the incoming trunk. Calls switch anywhere based on the dialed digits.

(5) DISK4E—Total number of AMA records written to disk. This count does not represent a service, but rather a total count for a switch.

Considering the 5ESS™ switch, some of the monitored information is:

(1) "AMAC5E"—This is a count of all calls in the 5ESS™ for which an AMA record must be formed. (Similar to DISK4E on the 4ESS™ switches);

(2) "TOANSW"—Answered toll calls that were not assisted by an operator;

(3) "TOOP"—Answered calls that were assisted by an operator;

(4) "TOUNANS"—Unanswered calls for which an AMA record was formed;

(5) "TOSPEC"—Answered special calls; and (6) "TOOTH"—Answered "other" calls.

The data relating to CDR on the 4ESS™ switch is organized in two ways. First, "MLSS" (Machine Load and Services Summary) provides hourly counts of CDR by switch and by type of service. The MLSS counts each call at the moment of its connection, i.e., when a connection is established between the caller and the callee. Depending on the type of service and on the switch generic, these counts may or may not include unanswered calls. Second, "Tracers" (Tracer record counts) are provided by the 4ESS™, and counts each call at the time of its disconnection (aggregated on an hourly basis).

Using the MLSS and Tracers data, CDRM has two main data types that it monitors:

Volumes—For each switch and service the volumes are in fact the sum of Full Charge, Partial Charge and Lost/Discarded records, as provided by the tracer records.

Ratios—These are obtained hourly by dividing the MLSS count by the tracer count, corresponding to each switch/service type.

Monitoring the volumes enables the detection of recording errors resulting from errors in suppliers' billing information, errors in network elements that feed into a switch, etc. Monitoring of the ratios allows the detection of recording errors due to intra-switch failures, database and provisioning errors, etc. Since ratios serve as a comparison between two separate recording elements in the network, it is more likely that deviations detected in their expected pattern are directly linked to actual recording failures.

FIG. 2 shows examples of volume timeseries for various services on one 4ESS™, while FIG. 3 shows examples of ratio timeseries. Specifically, FIG. 2A shows a timeseries for the BSDN service, FIG. 2B for the DSDC service, FIG. 2C for the MEG service and FIG. 2D for the PBEAV service. FIGS. 3A–D similarly represent volumes for the BSDN, DSDC, MEG and PBEAV services, respectively.

In each of the timeseries shown in FIGS. 2 and 3, a period of 4 weeks is depicted. The weekends and the 2 daily peak hours are easily noted on the volume timeseries. The period chosen contains no holidays. The regularity of the pattern is apparent for the BSDN, DSDC and PBEAV series, while the MEG data is much more variable. One reason for that is the relatively low volume counts for the MEG service—it is usually the large number of volume contributors that results in a regular pattern.

For the BSDN and DSDC services (FIGS. 3A and 3B, respectively) the ratios fluctuate around a mean value of ~1. This is to be expected since, over time, the number of calls connected should equal the number of calls disconnected. (Recall that the ratios are the number of connected calls divided by the number of disconnected calls.) The large spikes on those plots could be attributed to problems in recording, but they could also represent points of missing data which was here replaced using a start-up mechanism. (Details on missing data replacement and anomaly cleanup are presented below.)

The value of a ratio exceeds 1 when the number of calls that are being connected exceeds the number of calls being disconnected, as in the case, for example, during the starting business hours of each day. The ratio drops below 1 in the converse situation, when the number of disconnected calls outweighs the number of the calls being connected, as happens, for example, during the late afternoon hours for those business oriented services. In the 4E17 generic (introduced in all 4E switches during 1993), the PBEAV and MEG MLSS counts include unanswered calls, whereas the tracer counts don't. This explains the fact that the mean value for the corresponding ratios is around 1.3, and the more "noisy" pattern.

All ratios are preferably monitored on a hourly basis, as are also most of the volumes. When the hourly volume counts are low and thus subject to large statistical variations, daily monitoring of the volumes can be implemented. The decision on the frequency of monitoring, however, need not necessarily be applied globally for any particular service, but rather should depend on the volume counts. To improve the statistical quality of the monitoring, a service can be monitored hourly on some switches, and daily on others. A criterion to determine the appropriate frequency should consider the ratio p of the standard deviation of forecast errors to the busy-hour volume count. (Discussed further below.) For example, if p>10%, the critical alarms raised by the current volume monitoring algorithm won't be generated before a 100% drop in volume is present. In some cases, a variable may be monitored on both an hourly and a daily basis (or yet another level of aggregation). Larger deviations are detected in real-time, through the hourly monitoring. Smaller deviations, and sometimes even very small deviations (no more than 0.1%) can be detected at the end of the day (or at the end of the aggregation period).

Figure 4:
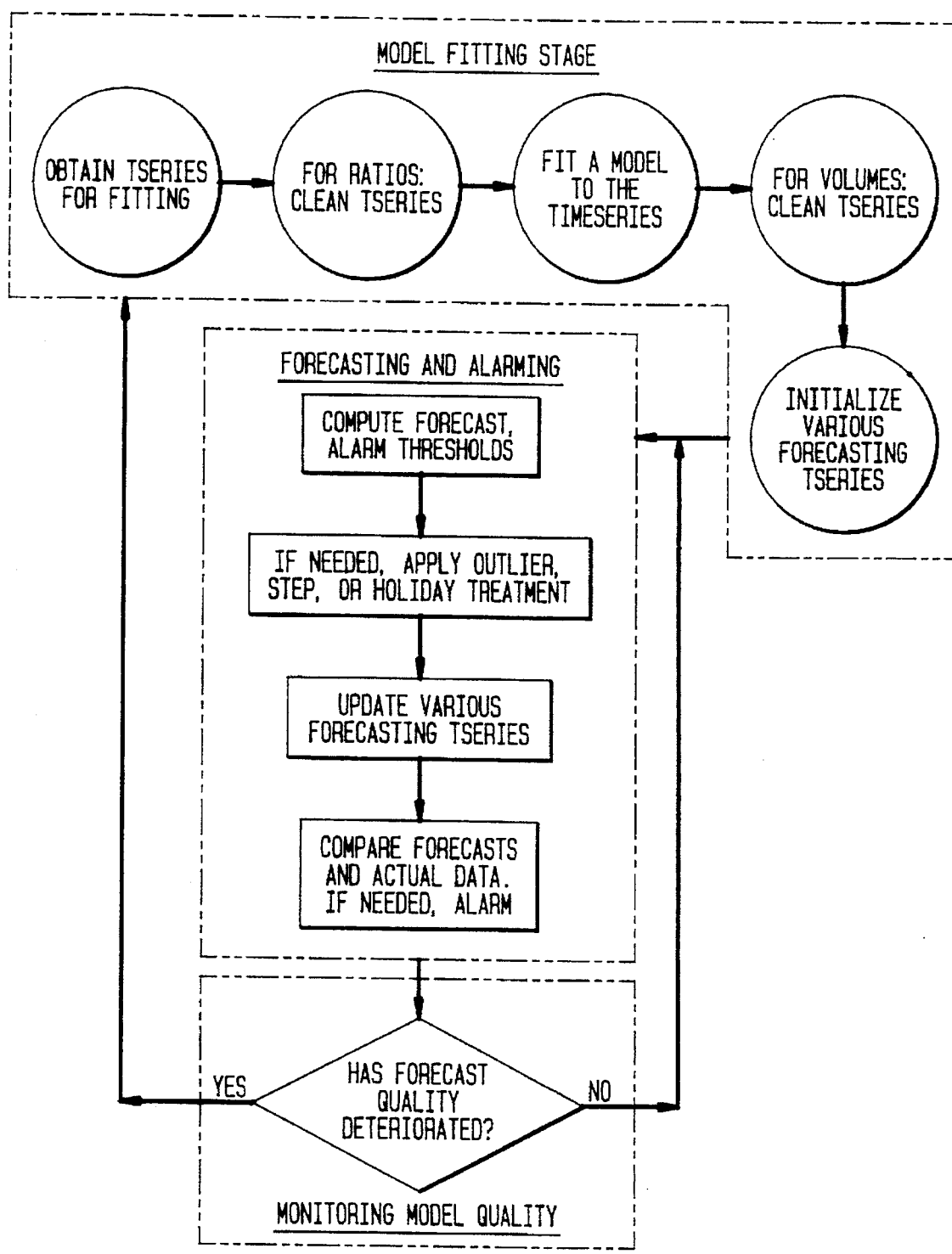
FIG. 4 is a flow chart of the overall method for predicting recording errors according to one embodiment of the invention.

The overall algorithm used by the present invention is illustrated in FIG. 4, and includes three stages: (1) a model fitting stage; (2) a forecasting and alarming stage; and (3) a model monitoring stage. The model fitting stage begins with obtaining a timeseries for fitting, containing at least 3 weeks of data, and preferably 4 weeks of data. If the timeseries is a ratio, a cleaning step then follows. After cleaning, a model is fit to the timeseries using the well known "Box-Jenkins" method. The Box-Jenkins method is documented in, for example, G. E. P. Box and G. M. Jenkins, "Time Series Analysis and Control", Revised Edition, Prentice Hall, 1976, and S. Makridakis, S. C. Wheelwritght, V. E. McGee, "Forecasting: Methods and Applications", John Wiley & Sons, 1983 each of which is incorporated herein by reference. For volumes, the timeseries is cleaned after model fitting, and then the various forecasting timeseries are initialized in preparation for stage 2.

After stage one is completed, the system moves into the forecasting and alarming stage. In this stage, the timeseries being monitored is compared to a forecast for that timeseries that is generated based on the model created in stage one. Alarm thresholds are also generated and, if the result of the comparison shows that the current timeseries differs from the forecast by more than the threshold, then an alarm is generated. The alarm will alert an operator to the potential recording error, which can then be investigated.

The specific steps for stage two, as shown in FIG. 4, include computation of forecasts and alarm thresholds, application of "outlier," step, and holiday treatment (if necessary), updating of the forecasting timeseries, and the comparison step for alarm generation if appropriate. In stage 3, the quality of a forecasting model is tested and a determination is made if a "refit" is needed, and if so, the system returns to stage one to create new models. If no refit is needed, the system returns to the beginning of stage two.

Details of data cleaning and initialization (stage one) as well as forecast computing, outlier treatment, alarm generation and refitting (stage two) are provided below.

Considering first the model generation of stage one, the Box-Jenkins method is preferred because it provides a systematic approach to fit Auto Regressive Integrated Moving Average ("ARIMA") models to timeseries. It is accurate, can accommodate seasonality and trends in the data, provides diagnostics to verify model validity and measures of forecast uncertainty, as well the theoretical means to ensure stability of the model. The method can be easily adjusted to various degrees of error level, through proper choice of data granularity, and when used in its multi-variate version enables correlating recording events across services or across switches.

Another important merit of Box-Jenkins is its computational simplicity: each forecast is obtained as a simple linear combination of a handful of historical values of the related timeseries. Combined with very modest storage and data access needs per forecast, this quality makes it especially suited for the very-large-scale and near-real-time monitoring challenge that CDRM poses.

In the traditional Box-Jenkins method, fitting an ARIMA model to a timeseries is an iterative process, that loops several times through the following 3 steps, until a satisfactory fit is found:

1. Determination of model form, or what terms will be used. This determination is primarily based on the examination of the autocorrelation function ("ACF") of the timeseries. One or more differencing steps may be required, depending on the existence of trends and periodicities in the timeseries. This step requires the judgment of one experienced in the Box-Jenkins method.
2. Estimation of model parameters. Usually this step involves some form of the standard statistical MLE (maximum likelihood estimate) optimization routine.
3. Diagnose the model for adequacy. The portmanteau lack of fit test is used.

Figure 5:
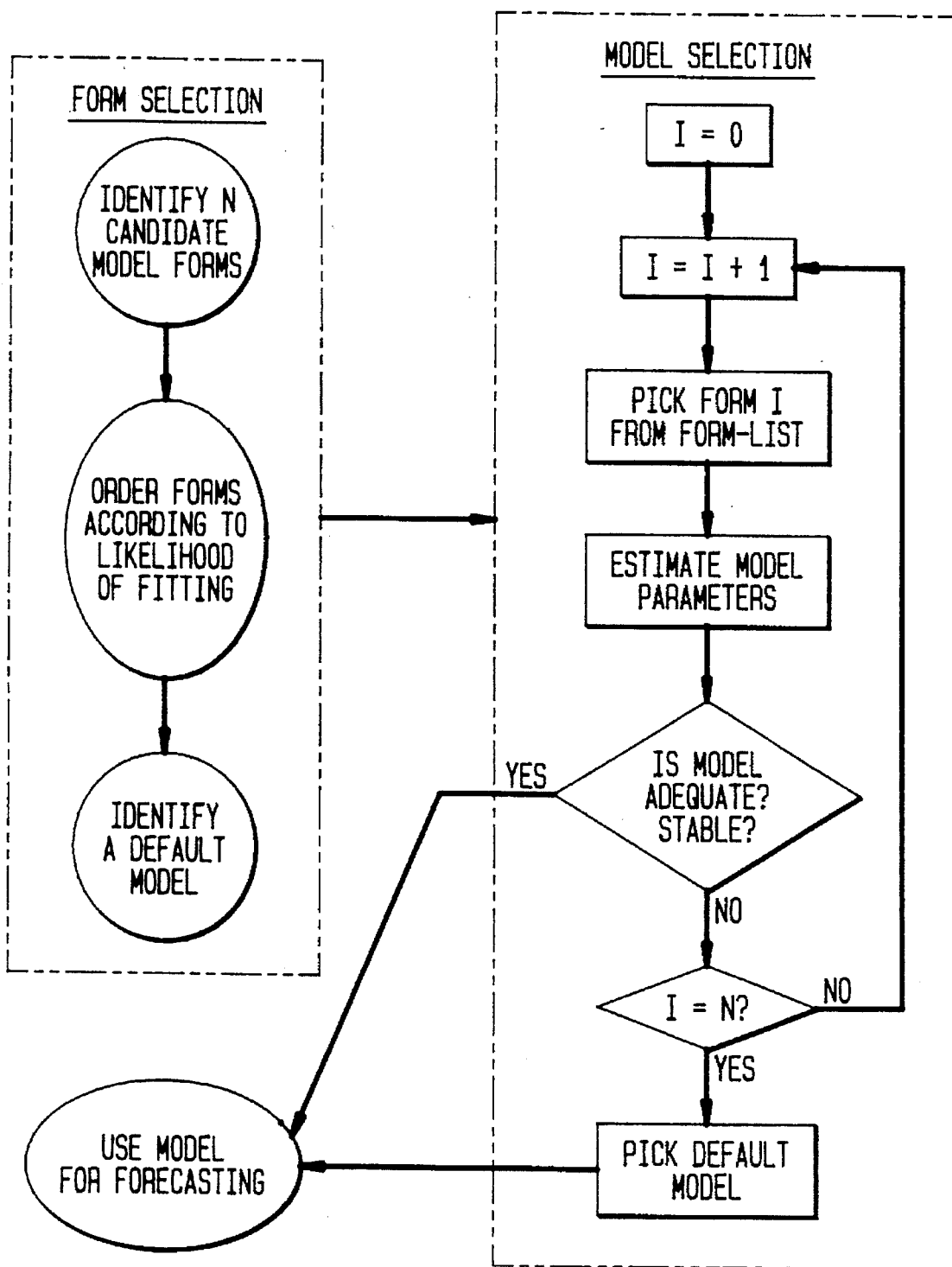
FIG. 5 is a flowchart illustrating the steps carried out for one portion of the flow chart shown in FIG. 3.

FIG. 5. illustrates how the traditional 3-step method is adapted to simultaneously fit a large number of timeseries with similar periodicities, without the repeated reliance on a human expert, as would be required by the traditional method. This adaptation is useful in light of the repeated need of model refitting due to changes in the timeseries patterns.

The algorithm of FIG. 5 also includes two stages, (1) form selection; and (2) model selection. In stage one, a number (N) of candidate model forms are selected by an expert, using the Box-Jenkins method, and are then ordered according to the likelihood of fitting. An ordered list of forms is customized for each service type separately. A general notation for two-seasonal ARIMA models is given by:

$$(p, d, q)(P_1, D_1, Q_1)^{s1}(P_2, D_2, Q_2)^{s2}.$$

This notation is well known in the art and is explained, for example, on page 428 of the Makridakis et al. reference cited above. In this notation, the two forms most frequently used in those lists, and also most likely to be used in a model, are represented by $(0, 0, 1)(0, 0, 1)^{24}(0, 1, 1)^{168}$ and $(0, 0, 1)(0, 1, 1)^{24}(0, 1, 1)^{168}$.

A default model is also chosen. This model uses the top priority form in the corresponding form list, along with parameters that are calculated as average values for the corresponding service and form.

Once the forms are selected and ordered, the system moves into stage two, where the models are generated by iteratively fitting the forms in the appropriate list to a given timeseries, by estimating their parameters. If no adequate and stable model is generated in this process, the appropriate default model is selected and used for forecasting.

Thus, once a model is fit to a timeseries using this algorithm, it is used to produce forecasts, on an hourly or daily basis, and, ultimately, alarms to warn of possible recording errors.

It is important to remove from the timeseries used for forecasting data "outliers" that might affect future forecasts. (Details about outlier detection and replacement are provided below.) For that purpose CDRM maintains an outlier-clean timeseries in addition to an actual timeseries.

Along with each model, CDRM's model fitting procedure provides an initial value $\sigma_0$ for the standard deviation of the forecast error. $\sigma_0$ is produced by applying a newly fit model to the same data to which it was fit. $\sigma_0$ is used as a starter to generate alarm thresholds, as explained below.

Each combination of switch/service/type of data that the system monitors is referred to as a variable. For each variable, the timeseries that the CDRM algorithms maintain include: "$x_t$," which is the actual value of variable x at time t (If data is missing before the initial model fitting stage, $x_t$ is replaced, as described further below); "$w_t$," which is equal to $x_t$ with outliers and missing data replaced on an ongoing basis; "$f_t$," the forecast for time t; "$\epsilon_t$," equal to $w_t-f_t$, the forecast error at time t (i.e., the forecast value at time t minus the actual value of the variable with outliers replaced); "$\sigma_t$," the approximate standard deviation of the forecast error at time t; "$b_t$"—$[(x_t-f_t)/\sigma_{t-1}]$, the normalized deviation level, before outlier treatment and "$r_t$"—$(\sigma_t/\sigma_0)$ used to determine "refits" as explained more fully below.

A typical forecast for an hourly model in CDRM is given by $$f_t = x_{t-168} - a(x_{t-1} - x_{t-169}) - b(x_{t-24} - x_{t-192}) + \qquad (1)$$

$$ab(x_{t-25} - x_{t-193}) - \alpha\epsilon_{t-168}$$

where a, b and α are parameters specific to the model.

Once the forecast has been determined using the Box-Jenkins technique, the alarm thresholds must be determined. Alarm thresholds in CDRM are determined by two factors:

1. $\sigma_t$—this is the current value of the sample standard deviation of the forecast error.
2. $\beta_{mn}, \beta_{mj}, \beta_{cr}$—these constants correspond to 3 levels of alarm thresholds: minor, major and critical. They are factors that multiply $\sigma_{t-1}$ to determine the width of the alarm threshold at time t.

To approximate $\sigma_t$ the following formula is used:

$$\sigma_t^2 = \frac{2}{n+1}\epsilon_t^2 + \frac{n-1}{n+1}\sigma_{t-1}^2 \quad (2)$$

In the above formula n is set to 672 for hourly models and to 28 for the daily ones.

At each point in time t (hourly or daily), the CDRM algorithm examines the quantity $$b_t = \frac{x_t - f_t}{\sigma_{t-1}},$$

and based on the examination alarms are generated as follows:

| | |
|---|---|
| minor alarm: | if $|b_t| > \beta mn$ |
| major alarm: | if $|b_t| > \beta mj$ |
| critical alarm: | if $|b_t| > \beta cr$ |

The values of $\beta_{mn}, \beta_{mj}$, and $\beta_{cr}$ can be controlled by the user, and can be adjusted separately for each type of data and type of service. This adjustment enables the user to control the number of alarms they want to be generated, and thus is one of the main parameters that allows flexibility to the user. The preferred default settings for the example described herein are given in Table 1:

TABLE 1

Default Settings for $\beta_i$

| type of data | $\beta_{mn}$ | $\beta_{mj}$ | $\beta_{cr}$ |
|---|---|---|---|
| Hourly | 5 | 7.5 | 10 |
| Daily | 3 | 5 | 7 |

Figure 6:
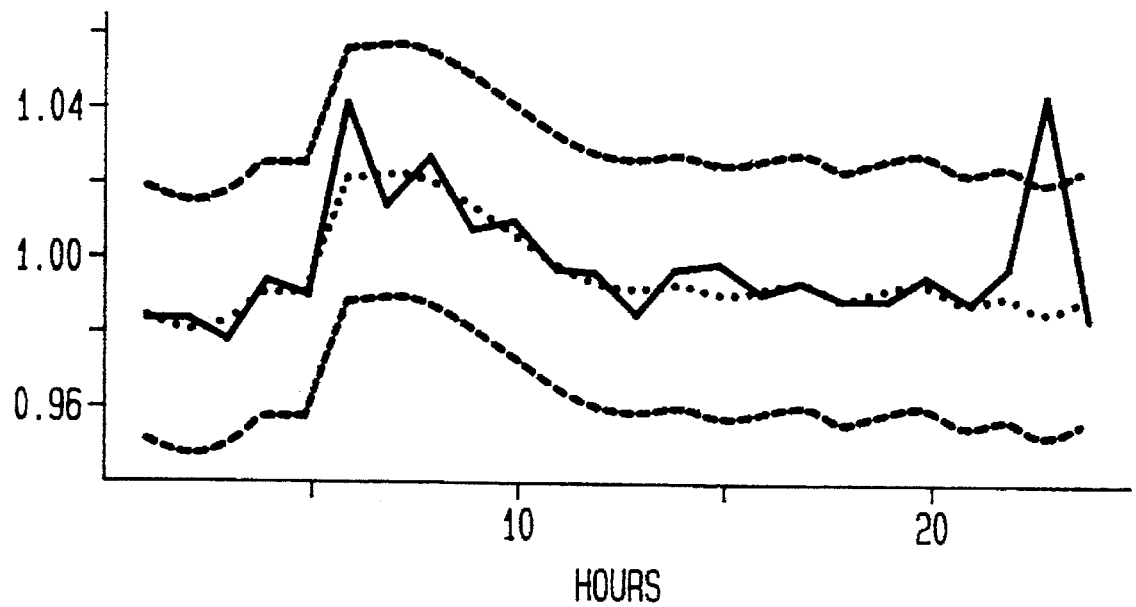
FIG. 6 is a chart illustrating an example of a timeseries for a service on an AT&T switch along with forecast and threshold data.
Figure 2A:
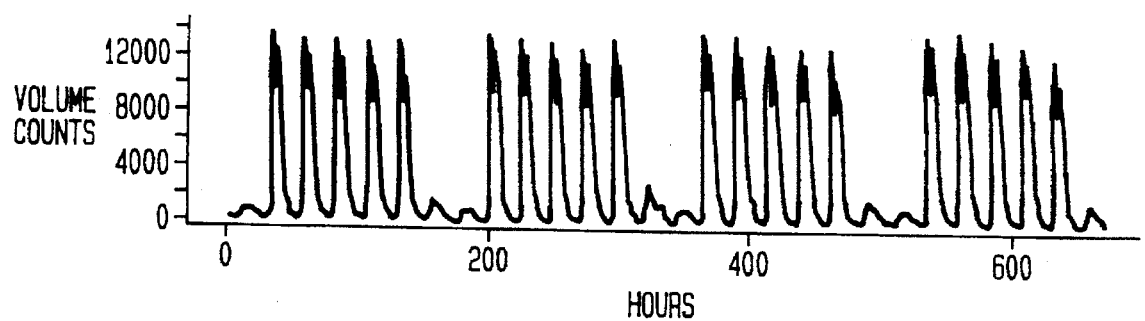
FIGS. 2A through 2D are graphs of "volume timeseries" (explained below) for various services provided by an AT&T 4ESS™ switch.
Figure 2B:
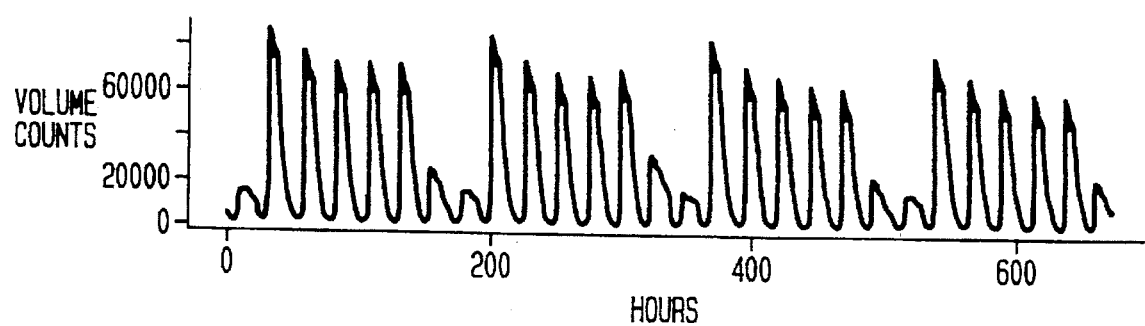
Figure 2C:
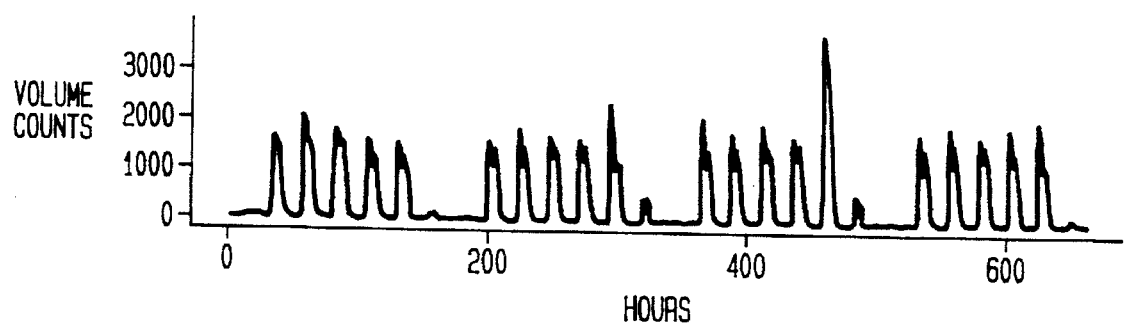
Figure 2D:
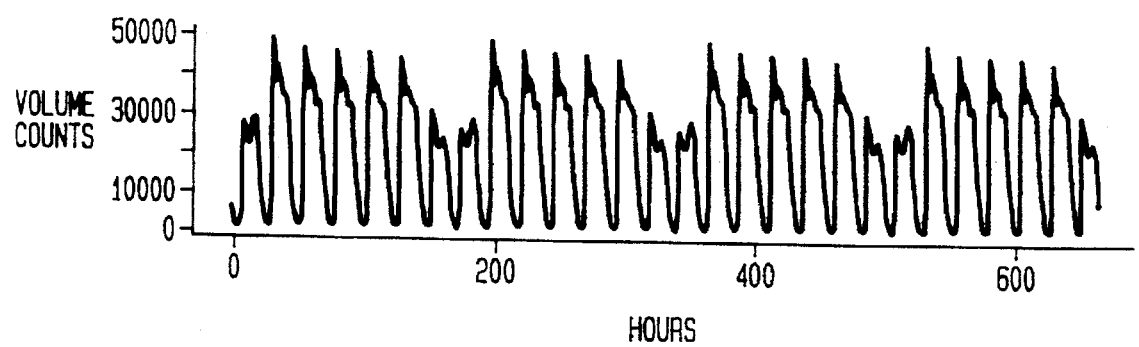
Figure 3A:
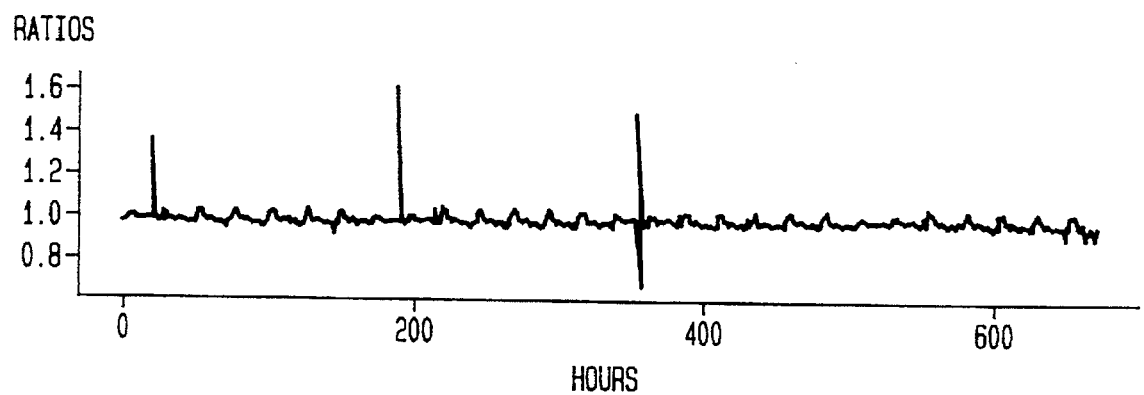
FIGS. 3A through 3D are graphs of "ratio timeseries" (explained below) for various services provided by an AT&T 4ESS™ switch.
Figure 3B:
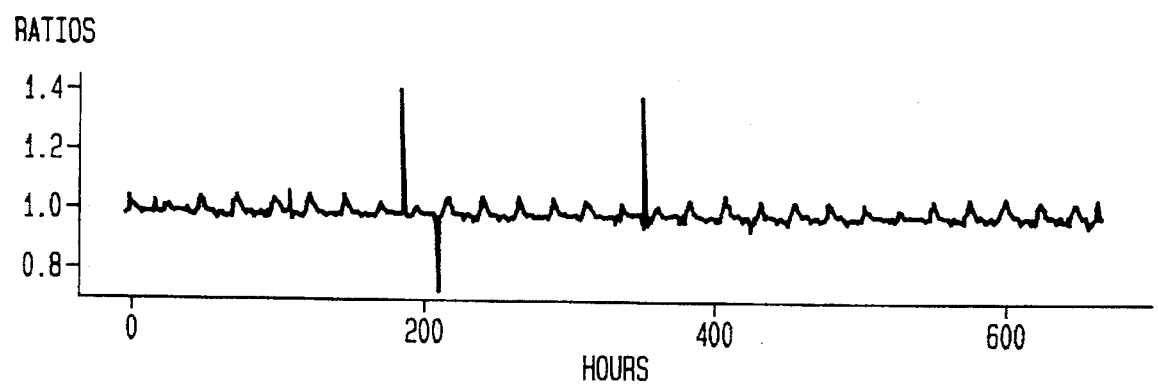
Figure 3C:
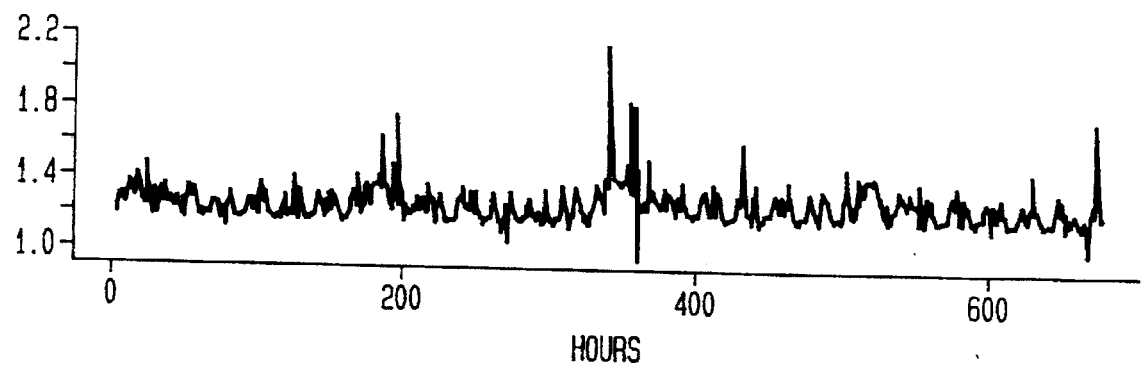
Figure 3D:
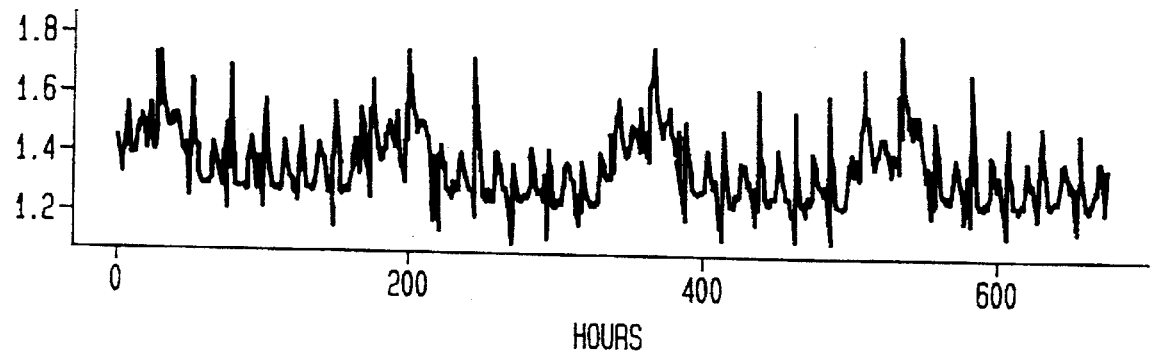

FIG. 6 shows an example of a timeseries (a ratio on a 4ESS™) and its associated forecasts and alarm thresholds. The solid line is the actual ratio, the dotted line is the forecast, and the two dashed lines represent the minor thresholds. For this example, an alarm would have been generated towards the right side of the graph, when the actual ratio exceeded the alarm threshold.

We refer to the quantities $\beta_{mn}\sigma_{t-1}, \beta_{mj}\sigma_{t-1}, \beta_{cr}\sigma_{t-1}$, as the minor, major, and critical threshold widths, respectively, i.e., the width of the minor, major, and critical alarm confidence interval. A quantity which is helpful in expressing the relative widths of the alarm thresholds is $$p_t = \frac{\sigma_{t-1}}{f_t} \quad (3)$$

Using (3), $\beta_{mn} P_t, \beta_{mj} P_t$, and $\beta_{cr} P_t$, provide the relative widths of the minor, major and critical alarm thresholds, respectively.

CDRM algorithms can be tailored to detect smaller errors in recording by adjusting the data granularity. For the daily ratios, the simple model:

$x_t = \mu + \epsilon_t$, where $\mu = \text{mean}(x_t)$ is sufficient to model the alarm thresholds. This model does not involve any computational effort for model fitting (as it does not involve any parameters) and only a trivial effort for forecasting: the forecast is always equal to the mean, and in its computation the mean can be computed over the past N values (in our example, N=28). (For generic 4E16 the mean is very close to 1 for all daily ratio variables). In this case (i.e., considering the daily ratios), $\sigma$ is simply the standard deviation of the daily timeseries itself, and $$p = \frac{\sigma}{\text{mean}(t\text{series})}.$$

Data pre-processing routines that are used before the forecasting algorithm is turned on are next described. CDRM uses the data in the timeseries it monitors in two major ways: (1) for model fitting or refitting; and (2) for generating forecasts, thresholds and alarms. For both purposes, it is desirable to have data that is free of outliers and does not have holes in it. Outliers in a timeseries which is used to create a model can disrupt the model fitting process by either causing it to fail or by producing an inadequate model. The use of a poorly fitting model, in turn, reduces the sensitivity of monitoring, inflates the alarm thresholds, and may interfere with the failure detection capability of CDRM. When present in a forecasting timeseries, outliers may corrupt the forecasts, causing false alarms to be generated. Both problems can be solved once the monitoring algorithm is turned on, as described below.

Missing data is not an uncommon problem, in particular when the MLSS data is considered. Before the monitoring algorithms are turned on, the missing values are replaced based on periodicity assumptions on the data. If most values of the timeseries $x_t$ are available in the range $1 \leq t \leq T$ (covering a period of at least 3 weeks), a missing $x_{t_o}$ can be simply replaced by $x_{t_o} = x_{t_o - 168k}$, where k is smallest integer such that $1 \leq t_o - 168k \leq T$, assuming $x_{t_o - 168k}$ is available. (4)

Alternatively, $x_{t_o}$ can be an average of several such $x_{t_k}$. Another alternative is to use some higher order interpolating formula.

This simple replacement is satisfactory for volume monitoring purposes, provided not too many values are missing. Too many such replacements may artificially boost the autocorrelation function of the fitting timeseries, interfering with the model quality. In that case it is best to delay the initial fitting until the missing data problem is alleviated.

The replacement policy from (4), or the like, can however, be inadequate for ratios, since the quotient of a replaced MLSS value to an existing tracer value may create a large deviation. Data cleanup procedures described next solve this problem. Another method to replace missing data after the monitoring has begun is described later on.

Two separate "data cleaning" procedures can be used, one for ratios and the other for volumes. The different characteristics of volumes and ratios, as well as the different nature of the data anomalies present in them, suggest different cleanup routines for the two data types are appropriate.

Ratios for the services monitored on the 4E55 switches fluctuate around a mean of ~1 for BSDN and DSDC services, and a mean of ~1.3 for the PBEAV and MEG services in the 4E17 generic. When no major anomalies are present, the standard deviations and the ranges of these timeseries are small relative to their means. Typical anomalies are few in number and have a negligible effect on the mean, while dramatically affecting the standard deviation and the range. The following ratio cleanup procedure is designed to remove these few anomalies with only a minimal effect on the remainder of the timeseries:

x=ratio timeseries to be cleaned

M=mean (x)

S=standard deviation (x)

R=range (x)

count=0 while $$\left(\frac{R}{S} \geq C_1 \text{ and count} < C_2\right)$$

identify the set $J=\{j:|x_j-M|>4S\}$ for (j∈J)

Replace $x_j$ by the average of $x_{j-168}$ and $x_{j+168}$ (wrap around ends of timeseries if needed)

Update M,S,R count=count+1

$C_1$ and $C_2$ are preferably set to 7 and 3, respectively.

Volume anomalies are often less prominent than the ratio anomalies, have a relatively smaller effect on the timeseries statistics, and may not be as easy to detect using such statistics unless they occur during busy hours. For all those reasons, with the exception of very significant anomalies, timeseries that contain them may still successfully pass the model fitting stage. However, if an anomaly is present, false alarms are likely to be generated once the forecasting stage begins, since the anomalous data is now believed to be normal. The volume cleaning procedure shown below provides some protection against this problem.

1. Partition the timeseries used for fitting into 168 sub-series, one sub-series for each hour of the week.
2. In each sub-series replace the max and min value by the mean of remaining values.
3. Re-assemble the timeseries.

This procedure is helpful in preventing the generation of false alarms, and is only applied once—after the initial fitting. It is not needed once forecasting begins, since then the outlier treatment will remove anomalies from the $w_t$ timeseries. It is also undesirable to apply it before fitting as its effect on the autocorrelation function of the timeseries can disrupt the fitting procedure.

A refitting of an existing model to the timeseries it models is occasionally needed. Refits are primarily needed because of changes in traffic pattern. These can cause a mismatch between a model and the timeseries it models. Such a mismatch is often evident in a significant or a persisting change in the forecast errors, and a corresponding change in $\sigma_t$ as given in (3). There are two main reasons for such a change. Namely, either the timeseries variability increases, or the timeseries variability decreases.

Such changes have undesirable effects on the alarming thresholds, which are determined by $\sigma_t$. In the first case, the thresholds increase, the monitoring sensitivity decreases, and the probability of subtle recording failures not being detected increases. In the second case, the decrease in $\sigma_t$ indicates that whatever noise was present during the model fitting period is now stabilizing, and therefore a better fitting model, and tighter alarm thresholds, may be achieved through refitting.

To detect changes in $\sigma_t$ the following timeseries is monitored:

$$r_t = \frac{\sigma_t}{\sigma_o}$$

A refit of the model is triggered if $r_t$ significantly deviates from 1 for a prolonged period of time. The refitting criteria used in the preferred embodiment is as follows.

Let $$r_t = \frac{\sigma_t}{\sigma_o}.$$

Perform a refit at time t if 1. t is not within 28 days since last "step detection" (discussed below);
2. t is not within 14 days of last refit;
3. and if:

For Hourly Timeseries
  i. $r_t, r_{t-1}, \ldots, r_{t-118} > 1.25$ and $r_{t-119} \geq 1.3$, or
  ii. $r_t, r_{t-1}, \ldots, r_{t-70} > 1.35$ and $r_{t-71} \geq 1.4$, or
  iii. $r_t, r_{t-1}, \ldots, r_{t-22} > 1.45$ and $r_{t-23} \geq 1.5$
  or
  i. $r_t, r_{t-1}, \ldots, r_{t-118} < 0.75$ and $r_{t-119} \leq 0.7$, or
  ii. $r_t, r_{t-1}, \ldots, r_{t-70} < 0.65$ and $r_{t-71} \leq 0.6$, or
  iii. $r_t, r_{t-1}, \ldots, r_{t-22} < 0.55$ and $r_{t-23} \leq 0.5$ For Daily Timeseries
  i. $r_t, r_{t-1}, \ldots, r_{t-3} > 1.35$ and $r_{t-4} \geq 1.4$, or
  ii. $r_t, r_{t-1} > 1.45$ and $r_{t-2} \geq 1.5$
  or
  i. $r_t, r_{t-1}, \ldots, r_{t-3} < 0.65$ and $r_{t-4} \leq 0.6$, or
  ii. $r_t, r_{t-1} < 0.55$ and $r_{t-2} \leq 0.5$ Refitting can also be triggered if a default model is in use, as described above. The default model is used after none of the forms in the appropriate form list prove successful through the model fitting process. Although an infrequent event, when it does happen it is often when the variability of the fitting timeseries is large, and patterns either aren't very clear, or they may vary within the timeseries used for fitting. Because of this, a refit is forced of a default model after 4 weeks of its use, assuming that data will be more stable then.

To avoid undesirable effects on the overall system's performance, the fitting/refitting process can be done off line, on a separate system. The process of refitting is preferably completely automated, and no human intervention is needed after the initial fitting. However, human intervention and control are allowed by the CDRM system.

Following each fitting, be it an initial fitting or refitting, several start-up stages are present. First, the "start up period" is the initial period during which forecasting cannot take place, because insufficient data had been accumulated. The length of this period is determined by the model form, and corresponds to the "look-back" period used by the model to generate its forecast. For the general 2-season ARIMA form, the duration of the start-up period $T_1$ is given by $$T_1 = \max\{p+d+S_1(P_1+D_1)+S_2(P_2+D_2), q+S_1Q_1+S_2Q_2\} \quad (5)$$

In the hourly models that CDRM uses, $T_1 \leq 193$ for the hourly models, and $T_1 \leq 8$ for the daily models.

The second start up stage is the "warm-up period." In models that contain an MA component, values of historical $\epsilon_t$ are used. Before forecasting is active these forecast error values are set to 0. The first 2-3 weeks of forecasting after each refitting are therefore a transient period until the $\epsilon_t$ stabilize at their steady state values. The $w_t$ timeseries, which depends on the $\epsilon_t$, must also be created.

This state of affairs could potentially cause two sorts of undesirable delays. First, following an initial fit, for which data corresponding to 4 weeks needs to be collected, a period of an additional 3-4 weeks would be needed before a new variable could be effectively monitored in the system. Second, following each refit, monitoring would have to be disrupted for about 3-4 weeks. In the CDRM algorithms these delays are eliminated allowing shorter variable introduction periods and, more importantly, continuous monitoring. This is accomplished as follows:

1. Once a model is fit to a timeseries, it is then applied to the same timeseries to produce forecasts (in the case of initial volume fitting—the timeseries is cleaned-up of anomalies before computing the forecasts).
2. The forecast-errors timeseries $\epsilon_t$ and the forecasting timeseries $w_t$ are populated, through the cleanup procedures and comparisons of actual and forecast values.
3. $\sigma_0$ is calculated based on the $\epsilon_t$.
4. The look-back period $T_1$ is calculated.
5. The output of the fitting process includes, besides the new model and $\epsilon_0$, also $\epsilon_t$ and $w_t$ timeseries of length $T_1$, whose end point coincides with the end-point of the fitting timeseries.
6. The forecasting program is able, once a refit request is issued, to "freeze" in time until the refit is completed, at which time forecasting resumes at the point of freeze.

For most of the time CDRM's monitored timeseries exhibit a quite regular seasonal pattern, allowing very accurate forecasts, and, depending on data type and service, often quite tight alarm thresholds. Nevertheless, events may happen that disrupt this regularity, and which do not necessarily represent recording errors. Examples of such events are many:

national holidays, local holidays, trunk rehoming, switch generic changes, seasonal changes in demand, e.g., college opening/closing commercial promotions, fare wars, storms, earthquakes, other natural disasters missing data.

Even when they do represent recording errors, after having produced the appropriate alarm, we need to "shield" the timeseries from the residual effects of such disruptions. These residual effects may adversely affect the algorithms by introducing false alarms in the future and/or impairing the refitting process, should one be triggered, by producing an inferior model and inflated $\sigma_0$.

It is the first of these effects that is of most concern. If the system allows anomalous data, or outliers, to be included in the $w_t$ and $\sigma_t$ timeseries, which are the timeseries used to calculate the subsequent forecasts, abnormal forecasts may be generated, therefore triggering false alarms.

The CDRM's treatment of outliers, missing data, and step changes which are not known to the system apriori, as well as the treatment of holidays are explained next.

To prevent the undesired impact of outliers on the monitoring algorithm's outputs we need to: (i) Select a criterion for outlier detection; and (ii) decide on an outlier replacement policy.

The outlier detection criterion is based on the degree of deviation of the actual data from the forecast produced by the algorithm: A value $x_t$ is identified as an outlier if $$|b_t| = \frac{|x_t - f_t|}{\sigma_{t-1}} > \beta_{out} \qquad (6)$$

$\beta_{out}$ in (6) is set to 7.

The setting of $\beta_{out}$ is somewhat arbitrary, and is based on experimentation with the data. It is probably one of the more important areas where field experience and feedback can be useful. A refinement of this criterion could allow $\beta_{out}$ to be a function of the model form, and maybe other parameters.

Once a value $x_t$ is judged to be an outlier, it receives the "outlier treatment", unless such treatment is inhibited. The preferred outlier treatment is as follows:

If $|x_t-f_t|>\beta_{out}\sigma_{t-1}$, then:

1. Generate an appropriate alarm.
2. Generate rnorm as a random variate from a unit normal distribution.
3. While rnorm>3 continue generating rnorm;
4. Set $\epsilon_t$ as rnorm. $\sigma_{t-1}$
5. Set $\omega_t$ as $f_t+\epsilon_t$.

As part of the treatment we introduce a random forecast error generated from a normal distribution with the appropriate standard deviation. The simple alternative to that would be just setting $\epsilon_t$ to 0. However, if a prolonged outlying event is present, the resulting $\omega_t$ timeseries would be overly correlated, and unfit for refitting.

Holidays, and periods that surround them, affect about 70 days per year. (This number does not include local holidays). In most cases the actual volume counts during a holiday largely deviate from their forecasts, yet rarely do they represent a recording failure.

Continued monitoring throughout the holiday periods is difficult. A given holiday may have varying effects from switch to switch and from year to year. CDRM deals with holidays as follows.

Global holiday periods have been identified and are stored in tables that are updated once a year. There are basically 2 types of global holidays. First are holidays that are observed on a fixed day of the week (Columbus Day, Presidents Day, Thanksgiving, Mother's day, Easter, Memorial day, Labor day, etc.). These holidays have a more predictable effect in terms of the periods they affect, although the magnitude of this effect varies from switch to switch and from one service type to the other. A major holiday observed on Monday, for example, would often affect volume counts starting the previous Thursday, with the effect lasting until the following Wednesday.

The second type of holidays are those observed on a fixed date of the year. These have a less predictable pattern. Fourth-of-July will have a different effect if it falls in the middle of the week than when it falls on or close to a weekend. The proximity and significance of the Christmas and New-Years holidays create a pattern of their own, that depends on the day of the week they occur. Studying their effect for a few years is therefore needed before their effect can be readily predicted.

Alarms are preferably suppressed during holiday periods. To avoid disrupting the timeseries window used for further forecasting, regular outlier treatment is applied to the $\epsilon_t$ and $w_t$ timeseries during a holiday period, as described above. The update of $\sigma_t$ is also suspended during a holiday period.

The various holidays have a much less pronounced effect on the ratios, and no special holiday treatment need be applied there.

The monitored timeseries often experience changes in pattern. Whenever the maximal or the average values in the timeseries experience a significant change in value, the pattern change is considered a "step." Since such a change may be of a more permanent nature, it is often undesirable to apply the outlier treatment in these cases. As the data arrives to the system on an hourly (or daily) basis, the system uses the following criterion to determine that a step change has occurred.

A step situation is present if the percentage P of outliers among any consecutive W values of the monitored timeseries $X_t$ exceeds a threshold T.

T is set to 25–30%, and W is set to 72 hours for a ratio timeseries and to 120 hours for a volume timeseries.

Whenever a step situation is detected in a monitored timeseries, the following procedure is applied:

1. The outlier treatment is suspended for $T_1$ time units.
2. All automatically triggered refitting requests are ignored for $T_2$ time units.

Step 1 allows for the forecasts to adjust to the new level of the timeseries, and step 2 prevents the performing of refits until at least 4 weeks of data at the new level have accumulated. $T_1$ is determined by formula (5), and $T_2$ is set to 672 for hourly models and to 28 for daily models.

Sometimes one or more entries $x_t$ are missing from a monitored timeseries. These values need to be backfilled in the corresponding $w_t$ timeseries, to allow the continuous functioning of the monitoring algorithm. This is done using the existing value of the forecast $f_t$, as follows (with some similarities to the outlier treatment described above):

1. Generate rnorm as a random variate from a unit normal distribution;
2. While rnorm>3 continue generation rnorm;
3. Set $\epsilon_t$ as $rnorm.\sigma_0$;
4. Set $w_t$ as $f_t+\epsilon_t$.

The preceding discussion of the invention is for illustrative purposes only and it should be understood that many modifications may be made as will readily be apparent to those skilled in this art.

I claim:

1. A method for detecting recording errors in a telephone network that provides services to a plurality of customers, said method comprising:

recording information output by said telephone network relating to the provision of a service to said customers in a first time period;

forecasting, based on said recorded information, an expected content of information that will be output by said network for a second time period that has not yet occurred;

recording information output by said telephone network relating to the provision of said service to said customers in said second time period; and comparing the result of said forecasting step with the information recorded during said second time period to generate a deviation.

2. The method of claim 1 further comprising the steps of:

forecasting, based on said information recorded during said second time period, the expected content of information that will be output by said network for a third time period that has not yet occurred;

recording information output by said telephone network relating to the provision of said service to said customers in said third time period; and comparing the result of said step of forecasting associated with said third time period with the information recorded during said third time period to generate a deviation.

3. The method of claim 1 further comprising the step of generating an alarm if said deviation is greater than a predetermined threshold.

4. The method of claim 1 wherein said steps are carried out for a plurality of services provided by said network, and an alarm is automatically generated each time a generated deviation is greater than a threshold.

5. The method of claim 1 wherein said first time period corresponds to a preceding time period and said second time period corresponds to a future time period, and wherein all of said steps are iteratively repeated to continuously generate deviations corresponding to a comparison of data recently output by said network and a forecast for said recently output data.

6. The method of claim 5 further comprising the step of generating an alarm if a generated deviation is greater than a predetermined threshold.

7. The method of claim 6 wherein said step of generating an alarm is suspended for data output by said network during a holiday period.

8. The method of claim 1 wherein said step of forecasting comprises the steps of:

generating a model to fit said information recorded in said first time period;

using said model to generate a forecast of data that will be recorded in said second time period.

9. The method of claim 8 further comprising the steps of periodically making a quality measurement of said model and determining, based on said quality measurement, whether a new forecasting model should be generated.

10. The method of claim 1 wherein each of said recording steps records information relating to the provision of each of a number of services to said customers.

11. The method of claim 10, further comprising the step of generating a timeseries for each service provided by said network, each said timeseries comprising data relating to the provision of a said service to said customers as a function of time.

12. The method of claim 11, wherein said step of forecasting further comprises the steps of:

generating a model to fit each of said timeseries;

using each said model to generate a forecast for each said timeseries to predict values for each said timeseries during a future time period.

13. The method of claim 12 wherein, for each said timeseries, said step of generating a model comprises:

identifying a number of potential model forms for said timeseries;

ordering said potential model forms according to the likelihood that each will fit said timeseries; and iteratively fitting each of said potential model forms to find a model that satisfactorily fits said timeseries.

14. The method of claim 12 wherein before said step of using each said model to generate a forecast for each said timeseries, said method comprises the steps of:

identifying, in each said timeseries, data that differs from forecast data by greater than a threshold; and replacing said identified data in each said timeseries.

15. The method of claim 13 wherein said step of generating a model further comprises generating a default model for each said timeseries, said default model being chosen as the model for a said timeseries if none of said potential model forms fit said timeseries.

16. The method of claim 13 wherein, for each said timeseries, said potential model forms are fitted from a stored library of model forms associated with each said timeseries.

17. The method of claim 11 wherein two timeseries are generated for each said service, including: (1) a volume timeseries identifying the number of times each said service is provided by said network as a function of time; and (2) a ratio timeseries identifying the ratio of the number of times said network connects a call corresponding to each said service over a given period of time to the number of times said network disconnects a call corresponding to each said service over said given period of time, as a function of time.

18. A method for detecting recording errors in a telephone network that provides services to a plurality of customers, said method comprising:

(a) recording information output by said telephone network relating to the provision of a service to said customers in a first time period;

(b) generating a model to fit said information recorded in said first time period;

(c) using said model to generate a forecast of information to be output by said network for a future time period;

(d) recording, during the occurrence of said future time period, information output by said telephone network relating to the provision of said service to said customers;

(e) comparing the forecast generated in step (c) with the information recorded in step (d) to generate a deviation; and (f) repeating steps (c)–(e) to continuously generate deviations between information output by said network and forecast information.

19. The method of claim 18 further comprising the steps of:

(g) periodically making a quality measurement of said model;

(h) determining, based on said quality measurement, whether a new forecasting model should be generated; and (i) if the result of step (h) indicates that a new forecasting model should be generated:

(j) generating a new forecasting model to fit information recorded in a predetermined prior time period; and (k) substituting said new forecasting model for the model being used for forecasting in the repeated implementation of steps (c)–(e).

20. The method of claim 19 wherein step (k) is carried out while maintaining the continuous generation of deviations as specified in step (f).

21. A method for detecting deviations between a monitored pattern and a forecast for said pattern, said method comprising:

(a) recording said pattern during a first time period;

(b) generating a model to fit said pattern recorded in said first time period;

(c) using said model to generate a forecast of said pattern in a future time period;

(d) recording said pattern during the occurrence of said future time period;

(e) comparing the forecast generated in step (c) with the pattern recorded in step (d) to generate a deviation;

(f) repeating steps (c)–(e) to continuously generate deviations between said pattern and a forecast of said pattern;

(g) periodically making a quality measurement of said model;

(h) determining, based on said quality measurement, whether a new forecasting model should be generated; and, if so:

(i) generating a new forecasting model to fit information recorded in a predetermined prior time period; and (j) substituting said new forecasting model for the model being used for forecasting in the repeated implementation of steps (c)–(e).

22. The method of claim 21 wherein step (j) is carried out while continuously generating deviations as specified in step (f).

23. The method of claim 21 further comprising the step of generating an alarm if said any of said generated deviations is greater than a predetermined threshold.

24. The method of claim 21 wherein said steps are carried out simultaneously for a number of patterns.

25. The method of claim 24 further comprising the step of generating a timeseries for each monitored pattern, each said timeseries comprising data relating to the value of said pattern as a function of time.

26. The method of claim 25, wherein said step of forecasting further comprises the steps of:

generating a model to fit each of said timeseries;

using each said model to generate a forecast for each said timeseries to predict values for each said timeseries during a future time period.

27. The method of claim 26 wherein, for each said timeseries, said step of generating a model comprises:

identifying a number of potential model forms for said timeseries;

ordering said potential model forms according to the likelihood that each will fit said timeseries; and iteratively fitting each of said potential model forms to find a model that satisfactorily fits said timeseries.

28. The method of claim 26 wherein before said step of using each said model to generate a forecast for each said timeseries, said method comprises the steps of:

identifying, in each said timeseries, data that differs from forecast data by greater than a threshold; and replacing said identified data in each said timeseries.

29. The method of claim 28 wherein said step of generating a model further comprises generating a default model for each said timeseries, said default model being chosen as the model for a said timeseries if none of said potential models fit said timeseries.

30. The method of claim 27 wherein, for each said timeseries, said potential model forms are selected from a stored library of model forms associated with each said timeseries.

31. A method for detecting deviations between a plurality of monitored patterns and a forecast for each said pattern, said method comprising:

(a) generating a timeseries for each monitored pattern, each said timeseries comprising data relating to the value of said pattern as a function of time;

(b) selecting a model to fit each said timeseries, said selection for each timeseries comprising the steps of:

(1) identifying a number of potential model forms for said timeseries;

(2) iteratively fitting each of said potential model forms to find a model that satisfactorily fits said timeseries;

(c) using said model to generate a forecast of each said timeseries in a future time period;

(d) recording each said timeseries during the occurrence of said future time period;

(e) comparing each forecast generated in step (c) with the timeseries recorded in step (d) to generate a deviation; and (f) repeating steps (c)–(e) to continuously generate deviations between said pattern and a forecast of said pattern.

32. The method of claim 31 wherein after step (a) and before step (c) said method comprises the additional steps of:

identifying, in each said timeseries, data that differs from forecast data by greater than a threshold; and replacing said identified data in each said timeseries.

33. The method of claim 31 wherein step (b) further comprises generating a default model for each said timeseries, said default model being chosen as the model for a said timeseries if none of said potential model forms fit said timeseries.

34. The method of claim 31 wherein, for each said timeseries, said potential model forms are selected from a stored library of model forms associated with each said timeseries.

35. A system for detecting recording errors in a telephone network that provides services to a plurality of customers, said system comprising:

means for recording information output by said telephone network relating to the provision of a service to said customers in a first time period;

means for forecasting, based on said recorded information, an expected content of information that will be output by said network for a second time period that has not yet occurred;

means for recording information output by said telephone network relating to the provision of said service to said customers in said second time period; and means for comparing the result of said forecasting step with the information recorded during said second time period to generate a deviation.

\* \* \* \* \*